United States Patent
Yang

(10) Patent No.: US 8,421,205 B2
(45) Date of Patent: Apr. 16, 2013

(54) POWER LAYOUT FOR INTEGRATED CIRCUITS

(75) Inventor: Chung-Chieh Yang, Hsinchu (TW)

(73) Assignee: Taiwan Semiconductor Manufacturing Company, Ltd. (TW)

( * ) Notice: Subject to any disclaimer, the term of this patent is extended or adjusted under 35 U.S.C. 154(b) by 174 days.

(21) Appl. No.: 12/775,035

(22) Filed: May 6, 2010

(65) Prior Publication Data
US 2011/0272782 A1 Nov. 10, 2011

(51) Int. Cl.
*H01L 23/52* (2006.01)
(52) U.S. Cl.
USPC ........... 257/691; 257/288; 257/207; 257/781; 257/E21.153; 257/E21.418; 257/E21.421; 257/E21.423; 257/E21.435; 257/E21.577
(58) Field of Classification Search .......... 257/207, 257/288, 322, 691, 678, 774, 781, E21.153, 257/E21.421, E21.423, E21.418, E21.435, 257/E21.577
See application file for complete search history.

(56) References Cited

U.S. PATENT DOCUMENTS

| 5,095,352 A * | 3/1992 | Noda et al. ................ 257/202 |
| 5,723,908 A * | 3/1998 | Fuchida et al. ............ 257/758 |
| 6,998,719 B2 * | 2/2006 | Campbell et al. ........... 257/786 |
| 7,462,941 B2 | 12/2008 | Campbell et al. |

FOREIGN PATENT DOCUMENTS

CN 101546345 9/2009

OTHER PUBLICATIONS

Office Action dated Jul. 4, 2012 from corresponding application No. CN 201010289505.6.

* cited by examiner

*Primary Examiner* — David Nhu
(74) *Attorney, Agent, or Firm* — Lowe Hauptman Ham & Berner, LLP

(57) ABSTRACT

A power layout of an integrated circuit includes at least one power grid cell. Each power gird cell includes at least one first power layer configured to be coupled to a high power supply voltage and at least one second power layer configured to be coupled to a lower power supply voltage. The at least one first power layer has conductive lines in at least two different directions. The at least one second power layer has conductive lines in at least two different directions.

13 Claims, 5 Drawing Sheets

US 8,421,205 B2

POWER LAYOUT FOR INTEGRATED CIRCUITS

TECHNICAL FIELD

The present disclosure relates generally to an integrated circuit, more particularly the power layout of an integrated circuit.

BACKGROUND

In the power layout of an integrated circuit, power grid connections and decoupling capacitors are implemented. Decoupling capacitance helps to prevent the integrated circuit from being affected by noise or voltage variations. In conventional methods, the power grid and decoupling capacitors are separately implemented. Because of the separate implementation, decoupling capacitors need extra time and efforts to be added to the power grid, and decoupling capacitance is not maximized in some cases.

Also, there can be wasted area with an irregular-shape layout (e.g., non-rectangular), especially when using multiple power domains, because the largest circuit block in the same power domain defines the boundary of a conventional power grid (e.g., rectangular).

Accordingly, new structures and methods for power layout are desired to improve on the above issues.

BRIEF DESCRIPTION OF THE DRAWINGS

Reference is now made to the following descriptions taken in conjunction with the accompanying drawings, in which.

DETAILED DESCRIPTION

The making and using of various embodiments are discussed in detail below. It should be appreciated, however, that the present disclosure provides many applicable inventive concepts that can be embodied in a wide variety of specific contexts. The specific embodiments discussed are merely illustrative of specific ways to make and use, and do not limit the scope of the disclosure.

Figure 1:
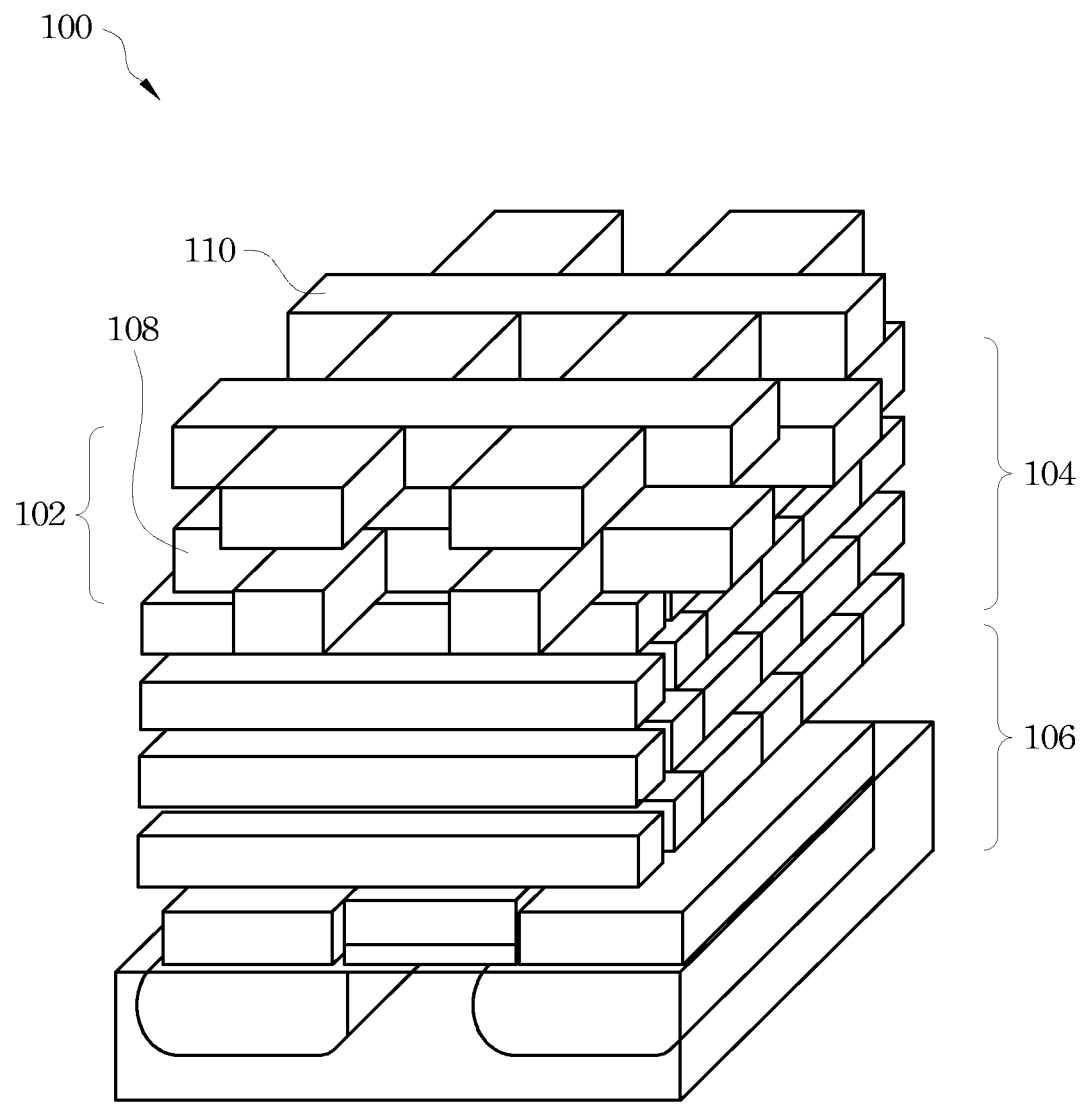
FIG. 1 is a schematic diagram showing an exemplary power layout according to some embodiments.

FIG. 1 is a schematic diagram showing an exemplary power layout according to some embodiments. A layout structure referred to as a power cap cell 100 includes a power grid cell 102, stack metal layers 104, and device layers 106. The power cap cell 100 and the power grid cell 102 are shown as a unit cell in this example. A unit cell is a minimal basic unit for a physical layout construction that forms a cell, e.g., the power cap cell 100 or the power grid cell 102. However, the cell, e.g., the power cap cell 100 or the power grid cell 102, can include multiple unit cells. In some embodiments of the cell having multiple unit cells, some parts, e.g., the power grid cell 102 are connected with each other, and other parts, e.g., the stack metal layers 104 are not connected with each other, as depicted in FIG. 3.

Figure 3:
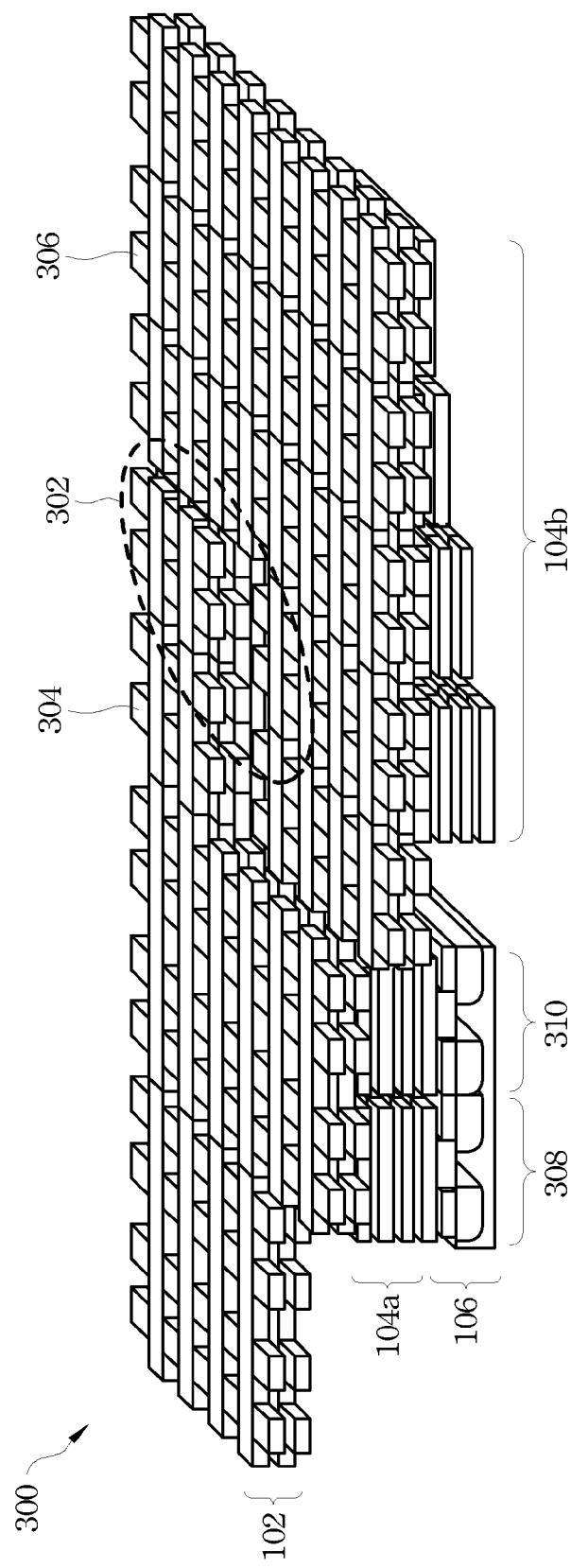
FIG. 3 is a schematic diagram showing yet another exemplary power layout according to some embodiments.

The cell can be of any size, and in some embodiments the cell size is bounded by the cell boundary in the layout, as depicted in FIG. 3. In some embodiments, the unit cell can be defined by an appropriate size according to applications, e.g., 20 μm×20 μm. The power grid cell 102 has at least two current conducting layers for two different voltages, e.g., a high power supply voltage VDD layer 108 and a low power supply voltage VSS layer 110. The capacitance between the two layers 108 and 110 contributes to the decoupling capacitance of the power cap cell 100. In some embodiments, the power grid cell 102 can have capacitors included in its structure.

The power cap cell 100 includes at least one power grid cell 102 and at least one additional capacitor in the stack metal layers 104 and/or in the device layers 106. The additional capacitor in the stack metal layers 104 can be a metal-oxide-metal (MOM)/metal-insulator-metal (MIM) capacitor. The additional capacitor in the device layers 106 can have structures such as P-channel or N-channel Metal-Oxide-Semiconductor (PMOS/NMOS) transistors with channel turned-on capacitors, varactors, etc., and/or any capacitors formed by any materials.

The power grid cell 102 in a power cap cell 100 conducts current in the two power supply voltages, e.g., VDD and VSS. The capacitance from the power grid cell 102 and the additional capacitor(s) in the power cap cell 100 contribute to the decoupling capacitance between the two power supply voltages, e.g., VDD and VSS. A power grid cell 102 or a power cap cell 100 can be referred to as a power cell. A power plan, i.e., a physical layout construction for power transportation, can be implemented using multiple power cells, e.g., power grid cells 102 and/or power cap cells 100.

The power grid cells 102 and/or power cap cells 100 can be used to replace and/or eliminate dummy patterns and implanted fast by reusing already designed power grid cells 102 and/or power cap cells 100. Also, if necessary, the power grid cells 102 and/or power cap cells 100 can be replaced easily with power grid cells 102 and/or power cap cells 100 having different number of layers that have compatible cell designs, depending on the design needs, e.g., decoupling capacitance or current density, etc. The power cap cell 100 can be copied or repeated to fill up certain part of a layout to increase decoupling capacitance of the layout, as shown in FIG. 3 described below.

Figure 2:
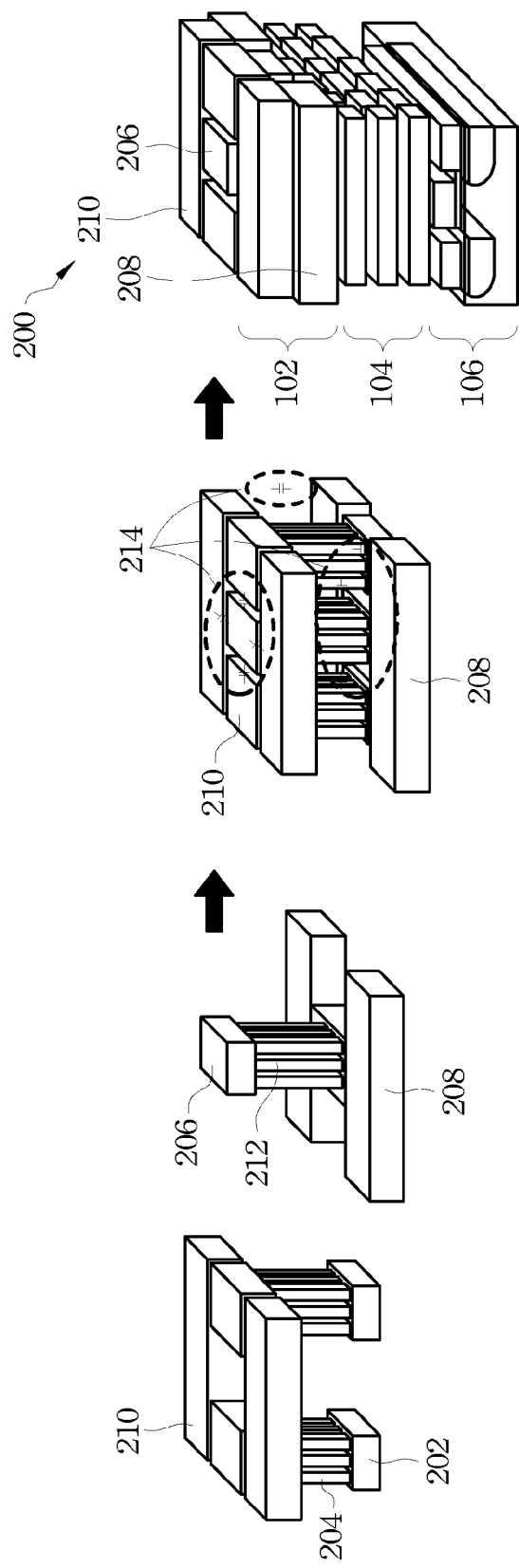
FIG. 2 is a schematic diagram showing another exemplary power layout according to some embodiments.

FIG. 2 is a schematic diagram showing another exemplary power layout according to some embodiments. A layout structure referred to as a power cap cell 200 includes a power grid cell 102', stack metal layers 104, and device layers 106. In this example, the power grid cell 102' has a square grid VSS layer 210 surrounding a smaller square VDD layer 206, and an H-shape VDD layer 208 connected to the VDD layer 206 through vias 212 and two smaller square VSS layer 202 connected to the square grid VSS layer 210 through vias 204. Even though a pair of layers is shown to make up for the power grid cell 102', any number of layers can be used to make up the power grid cell 102', including stacked multiple pairs of VDD and VSS layers.

The various capacitances 210 between VDD and VSS from different structures, e.g., 202, 204, 206, 208, 210, and 212, contribute to the decoupling capacitance in the power grid cell 102'. In some embodiments, the power grid cell 102 has capacitors included in its structure. The stack metal layers 104 and the device layers 106 are as described above in FIG. 1. The power cap cell 200 can be copied or repeated to fill up certain part of a layout to increase decoupling capacitance of the layout. When copying or repeating the power cap cell 200, the outside lines of the power grid cell 102', e.g., VSS layer 210 and VDD layer 208, can be shared among neighboring power cap cells 200, e.g., as shown in FIG. 4 described below.

FIG. 3 is a schematic diagram showing yet another exemplary power layout according to some embodiments. The irregular shape (i.e., non-rectangular) of the power cells 304 and 306 in separate power domains is accommodated by the flexible designing of an isolation 302 that saves area between separate power domains. The power cell 304 includes a plurality of interconnected power grid cells 102 and disconnected stack layers 308 and 310 including stack metal layers 104a and device layers 106, which increases decoupling capacitance. The power grid cells 102 above the disconnected stack layers 308 and 310 are connected together for power transportation.

The power cell 306 includes different layer depths for the stack metal layers 104b having no device layers 106 below. A power cell, e.g., 304 and/or 306, including multiple power cap cells, e.g., 100 and/or 200, and power grid cells, e.g., 102, may have different depths of layers depending on the availability of layers and desired decoupling capacitance at each location in the layout. For example, any number of stack metal layers can be used, e.g., 0, 1, 2, . . . , etc., as shown in exemplary stack metal layers 104b. This provides design flexibility to find a balance between manufacturing considerations and circuit performance, as well as efficient area usage.

Figure 4:
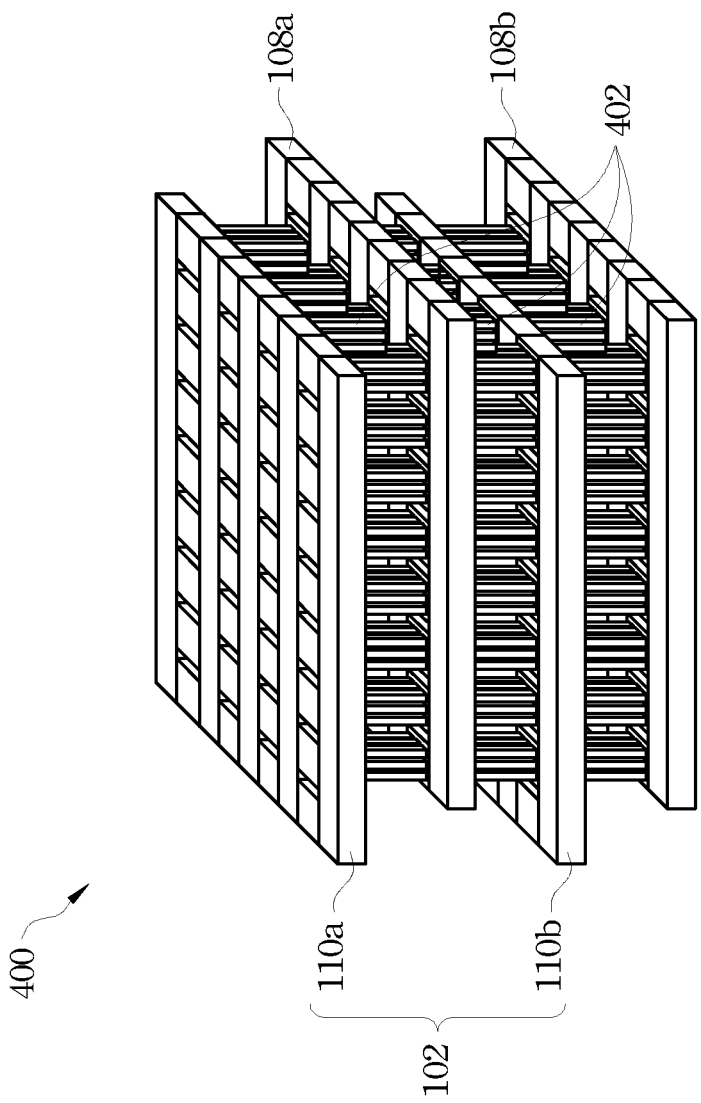
FIG. 4 is a schematic diagram showing an exemplary power grid with stacked layers according to some embodiments.

FIG. 4 is a schematic diagram showing an exemplary power grid with stacked layers according to some embodiments. The power grid cell 102" includes two pairs of VSS layer and VDD layer, e.g., 110a/108a and 110b/108b, connected through vias 402. The connected VSS and VDD layers enhance current density capability for applications with large current-density usage or limited power routing area.

Figure 5:
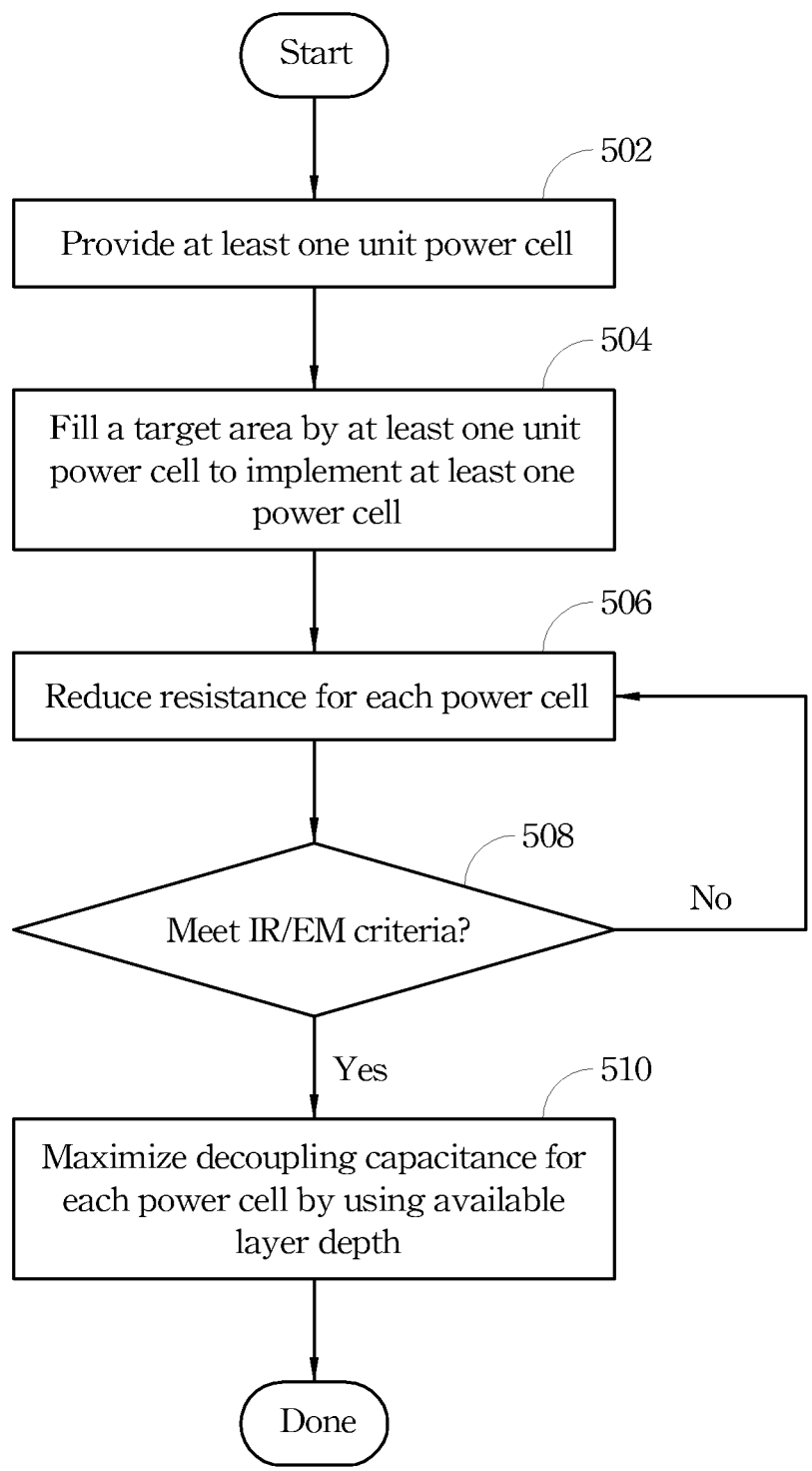
FIG. 5 is a flowchart showing an exemplary method for a power layout according to an embodiment.

FIG. 5 is a flowchart showing an exemplary method for a power layout according to an embodiment. At step 502, at least one unit power cell is provided for power cells, e.g., a power grid cell 102 or a power cap cell 100 or 200. The unit power cell includes at least one power grid cell 102 (or 102' or 102"). Each power grid cell 102 has at least one first power layer, e.g., 108, coupled to a high power supply voltage, e.g., VDD, and at least one second power layer, e.g., 110, coupled to a lower power supply voltage, e.g., VSS. The first power layer, e.g., 108, and the second power layer, e.g., 110, have conductive lines in at least two different directions, e.g., perpendicular directions. In some embodiments, the unit power cell further includes at least one metal layer below the at least one power grid cell 102. In some embodiments, the unit power cell further includes at least one device layer below the at least one power grid cell 102.

At step 504, a target area in the power layout is filled by at least one unit power cell (or arrays of unit power cells) to implement at least one power cell. At step 506, the resistance for each power cell is reduced, e.g., in some embodiments, by connecting multiple layers of stacked power grid cells through vias, increasing the area of a given layer, etc. At step 508, the power layout is checked to determine whether it meets the IR, i.e., current-resistance product or a voltage drop, and EM, i.e., electromigration, criteria for desired applications. EM relates to a current density, which is current over the cross-section area of a conducting metal line. If a current density larger than what is allowed occurs on the metal lines, EM may cause permanent damage to this conducting metal. At step 510, decoupling capacitance is maximized for each power cell by using available layer depth at each location in the layout.

A skilled person in the art will appreciate that there can be many embodiment variations of this disclosure. Although the embodiments and their features have been described in detail, it should be understood that various changes, substitutions and alterations can be made herein without departing from the spirit and scope of the embodiments as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosed embodiments, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The above method embodiment shows exemplary steps, but they are not necessarily required to be performed in the order shown. Steps may be added, replaced, changed order, and/or eliminated as appropriate, in accordance with the spirit and scope of embodiment of the disclosure.

Each claim of this document constitutes a separate embodiment, and embodiments that combine different claims and/or different embodiments are within scope of the disclosure and will be apparent to those skilled in the art after reviewing this disclosure. Accordingly, the scope of the disclosure should be determined with reference to the following claims, along with the full scope of equivalences to which such claims are entitled.

What is claimed is:

1. An integrated circuit with a power layout, comprising:
   at least one power grid cell, wherein each power grid cell includes:
      a first power layer having conductive lines arranged along at least two different directions, the conductive lines of the first power layer being configured to be electrically coupled to a first power supply voltage; and
      a second power layer under the first power layer and having conductive lines arranged along at least two different directions, the conductive lines of the second power layer being configured to be electrically coupled to a second power supply voltage different from the first power supply voltage.

2. The integrated circuit of claim 1, wherein each power grid cell further includes a capacitor structure different from and stacked with the first and second power layers.

3. The integrated circuit of claim 1, further comprising at least one metal layer below the at least one power grid cell.

4. The integrated circuit of claim 3, wherein the at least one metal layer includes at least one metal-insulator-metal (MIM) capacitor.

5. The integrated circuit of claim 1, further comprising at least one device layer below the at least one power grid cell.

6. The integrated circuit of claim 5, wherein the at least one device layer includes at least one transistor.

7. The integrated circuit of claim 1, wherein the at least one power grid cell comprises two or more interconnected power grid cells within a target area of the power layout.

8. The integrated circuit of claim 1, wherein the first power layer has a rectangular grid structure.

9. The integrated circuit of claim 1, wherein the second power layer has a rectangular grid structure.

10. An integrated circuit with a power layout, comprising:
    at least one power grid cell, wherein each power grid cell includes:

at least one first power layer configured to be coupled to a high power supply voltage, wherein the at least one first power layer has conductive lines in at least two different directions; and at least one second power layer configured to be coupled to a lower power supply voltage, wherein the at least one second power layer has conductive lines in at least two different directions, wherein the at least one first power layer is connected to each other by first vias and the at least one second power layer is connected to each other by second vias.

11. A power layout of an integrated circuit comprising:

at least one power grid cell, wherein each power grid cell includes:

at least one first power layer having conductive lines configured to be coupled to a high power supply voltage and arranged in at least two different directions; and at least one second power layer having conductive lines configured to be coupled to a lower power supply voltage and arranged in at least two different directions, the at least one first power layer and the at least one second power layer being stacked one over another;

at least one metal layer below the at least one power grid cell; and at least one device layer below the at least one metal layer.

12. The power layout of claim 11, wherein the at least one metal layer includes at least one metal-insulator-metal (MIM) capacitor.

13. The power layout of claim 11, wherein the at least one device layer includes at least one transistor.

* * * * *